P. E. WASHBURNE & C. A. BABCOCK.
SNAP-HOOK.

No. 176,388. Patented April 18, 1876.

Witnesses
Edward Wilhelm
C. J. Buchheit

Inventors
Pliny E. Washburne
Charles A. Babcock
by Jay S. Hyatt
Atty.

N. PETERS, PHOTO-LITHOGRAPHER, WASHINGTON, D C.

UNITED STATES PATENT OFFICE.

PLINY E. WASHBURNE AND CHARLES A. BABCOCK, OF BUFFALO, N. Y.

IMPROVEMENT IN SNAP-HOOKS.

Specification forming part of Letters Patent No. 176,388, dated April 18, 1876; application filed October 12, 1875.

*To all whom it may concern:*

Be it known that we, PLINY E. WASHBURNE and CHARLES A. BABCOCK, both of the city of Buffalo, in the county of Erie and State of New York, have invented new and useful Improvements in Snap-Hooks, which improvements are fully set forth in the following specification:

Our invention relates more particularly to the manner of securing the spring which closes the mouth of the hook to the shank or body thereof.

Figure 1:
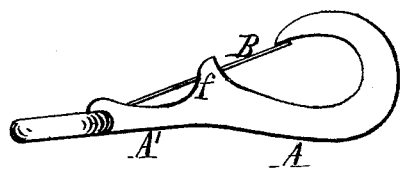
Figure 2:
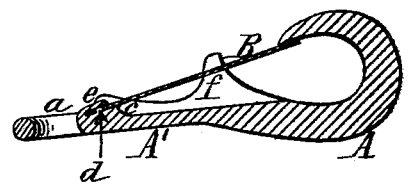
Figure 4:
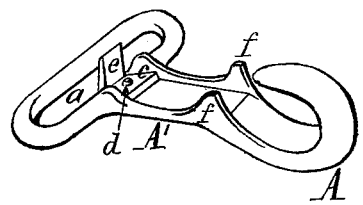
Figure 3:
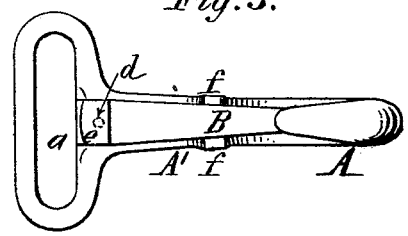

In the accompanying drawing, Figure 1 is a side elevation of a snap-hook provided with our improvements. Fig. 2 is a vertical section, and Fig. 3 is a top plan view of the same. Fig. 4 is a perspective view of the body of the hook previous to securing the spring thereto.

Like letters of reference designate like parts in each of the figures.

A represents the body of the hook, A' the shank thereof, and $a$ the loop formed at one end of the shank. B is the spring secured to the shank A' near the loop $a$, and bearing with its free end under the point of the hook proper. The shank A is provided with a depressed portion or seat, $c$, for receiving the spring B. $d$ is a projecting stud or teat cast on the seat $c$, and adapted to enter a corresponding hole in the spring B. $e$ is an upwardly-projecting lip or flange, cast with the shank A' in the rear of the seat $c$, as clearly shown in Fig. 4. $f\ f$ represent two side guards cast with the shank A near the middle of the spring so as to prevent lateral displacement of the free end thereof. The spring is secured to the shank of the hook by placing its end provided with a hole, on the seat $c$, so that the stud $d$ enters the hole in the spring when the lip $e$ is bent down over the end of the spring, so as to securely clamp the latter. In using our improved snap-hook, the side guards $f$ not only protect the spring but also serve as thumb-guides in preventing the thumb from closing the mouth of the hook when depressing the spring.

What we claim as our invention is—

1. The combination, with the spring B and body A of a snap-hook, provided with seat $c$, of the stud $d$, formed on said seat and adapted to engage in a hole in the spring, and the lip $e$ adapted to be bent over the end of the spring for securing the latter in place, substantially as hereinbefore set forth.

2. The combination, with the spring B, of the body A, provided with seat $c$, stud $d$, lip $e$, and side guards $f\ f$, constructed and arranged substantially as hereinbefore set forth.

PLINY E. WASHBURNE.
CHAS. A. BABCOCK.

Witnesses:
JNO. J. BONNER,
EDWARD WILHELM.